United States Patent
Nozawa et al.

(10) Patent No.: US 7,422,383 B2
(45) Date of Patent: Sep. 9, 2008

(54) PHOTOSENSITIVE MATERIAL PROCESSOR

(75) Inventors: Ryoei Nozawa, Kanagawa (JP); Hideto Yamamoto, Kanagawa (JP); Toshihiro Suya, Kanagawa (JP); Daisuke Hibe, Kanagawa (JP); Keiichi Adachi, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 76 days.

(21) Appl. No.: 11/193,622

(22) Filed: Aug. 1, 2005

(65) Prior Publication Data

US 2006/0056841 A1 Mar. 16, 2006

(30) Foreign Application Priority Data

Jul. 30, 2004 (JP) ............................. 2004-224347

(51) Int. Cl.
*G03D 3/02* (2006.01)
*G03D 3/08* (2006.01)

(52) U.S. Cl. ...................... 396/617; 396/620; 396/622; 396/626; 396/636; 355/27; 355/29

(58) Field of Classification Search ............. 355/27–29; 396/626, 636, 641, 617, 620, 622

See application file for complete search history.

(56) References Cited

U.S. PATENT DOCUMENTS

| | | | | |
|---|---|---|---|---|
| 5,258,796 | A * | 11/1993 | Patterson | ..................... 396/572 |
| 5,349,412 | A * | 9/1994 | Miyasaka | .................... 396/571 |
| 6,402,397 | B1 * | 6/2002 | Piccinino et al. | ............. 396/565 |
| 6,851,873 | B2 * | 2/2005 | Muraoka et al. | ............. 396/611 |
| 6,910,815 | B2 * | 6/2005 | Nozawa et al. | ............... 396/602 |

FOREIGN PATENT DOCUMENTS

| | | |
|---|---|---|
| JP | 5-119454 A | 5/1993 |
| JP | 2002-241504 A | 11/2002 |
| JP | 2003-270766 A | 9/2003 |

* cited by examiner

*Primary Examiner*—Della J. Rutledge
(74) *Attorney, Agent, or Firm*—Sughrue Mion, PLLC

(57) ABSTRACT

Developer is supplied to a first spray pipe disposed in a developing bath. The inside of the developing bath is provided with a heater. A liquid-flow generating unit comprises a liquid-flow generating head and a branch duct, which is connected to a branch pipe of the first spray pipe via a rubber hose. A part of the developer flowing in the first spray pipe is forwarded to the liquid-flow generating head. By a gap-forming ring, a gap is secured between an outer surface of the heater and an inner surface of the liquid-flow generating head so that the developer uniformly flows along the outer surface of the heater in a longitudinal direction thereof. A heater cover is attached to the liquid-flow generating head. An inner surface of the heater cover inclines in the longitudinal direction of the heater.

33 Claims, 9 Drawing Sheets

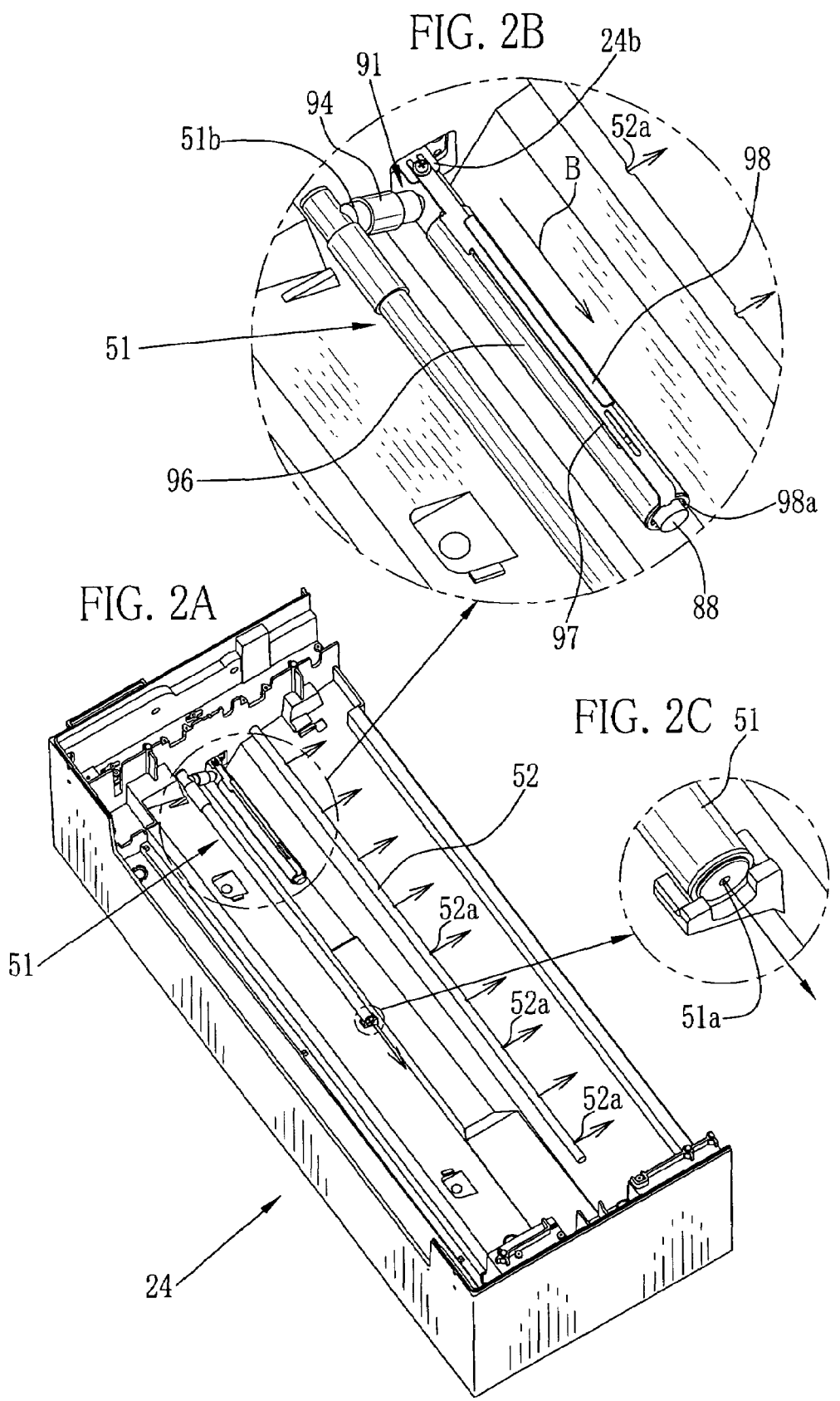

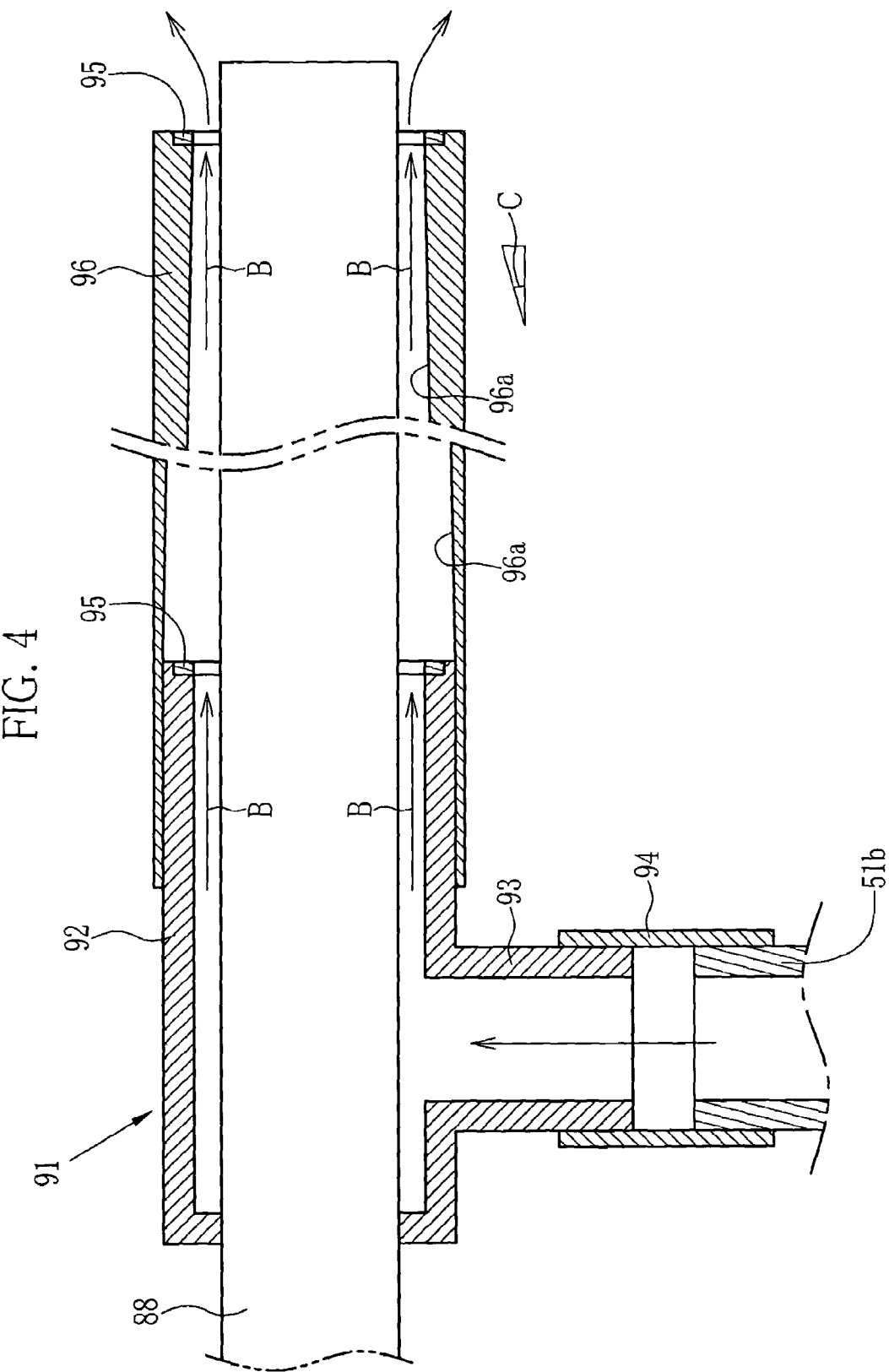

PHOTOSENSITIVE MATERIAL PROCESSOR

BACKGROUND OF THE INVENTION

1. Field of the Invention

The present invention relates to a photosensitive material processor in which a photosensitive material of a photosensitive planographic printing plate and so forth is carried and is processed in a processing liquid.

2. Description of the Related Art

With respect to a photosensitive material, there is a photosensitive planographic printing plate (simply called as PS plate hereinafter) in which a photosensitive layer is formed on a support of aluminum and so forth. A PS-plate processor, which is a photosensitive material processing apparatus for processing the PS plate, performs a plurality of processes by using a processing liquid. As to these processes, for instance, there are a developing process in which the PS plate is dipped in a developer, a washing process in which water is applied onto the PS plate, and a desensitizing process in which a surface of the PS plate is coated with a desensitization treatment liquid of gum liquid and so forth after the washing process. In the PS processor, the processes of developing, washing, desensitizing and so forth are performed for the image-exposed PS plate.

In the developing process of this kind of the PS-plate processor, the PS plate is carried while dipped in the developer contained in a developing bath. By virtue of this, the photosensitive layer no longer required after the image exposure is removed from the surface of the PS plate. In the developer, ingredients of image colorant and so forth are transferred from the PS plate during the developing process of the PS plate. The transferred ingredients are deposited and aggregated to become solids. It is likely to cause a harmful effect that the solids adhere to the PS plate. If the developing process is finished in a state that the solids adhere to the PS plate, there arises a problem in that a print is soiled by the adhering solids. In consideration of this, filtration is performed by a filter so as to prevent the particulate ingredients, dust and so forth from adhering to the photosensitive material during the process (see Japanese Patent Laid-Open Publication Nos. 5-119454 and 2002-341504). Moreover, by projecting a delivery pipe of the processing liquid up to a predetermined height from the bottom of the processing bath, sediment deposited at the bottom of the processing bath is prevented from being raised up at a time of delivery of the processing liquid so that the sediment is prevented from adhering to the photosensitive material (see Japanese Patent Laid-Open Publication No. 2003-270766).

As mentioned above, when the processing liquid is continuously used, the liquid deteriorates and the solids generated due to the deterioration thereof causes the problem that the solids adhere to the photosensitive material. It is desired to improve this problem. For this purpose, factors for generating the solids in the developer have been keenly examined. As a result, the inventors of this application have found that the solids are generated due to a relationship between the developer and a heater used for keeping the developer at a constant temperature, such as described below. Some of the PS plates use water-insoluble image colorant, and a system is incorporated so as to prevent this image colorant from depositing and so as to maintain a dispersion state by employing binder ingredients. When processing this kind of the PS plate, the image colorant is transferred from the PS plate to the developer, and the binder ingredient included in the PS plate acts to maintain the dispersion state wherein the image colorant resides in the developer as if dissolving therein. When large amounts of the PS plates are processed, a density of the image-colorant ingredients increases. At this time, upon turning on the heater for stabilizing the temperature of the developer, the temperature of the developer rises at a heater surface. In a conventional heater drive, the heater is adapted to heat up a processing liquid at full power in order to make a waiting time shortest at the start of operation. The inventors of this application have found that the dispersion state of the image colorant breaks and the solids appear on the heater surface in a circumstance that a temperature of the heater surface is heated up so as to be about 80° C. or more. A part of the solids of the image colorant separates from the heater and adheres to the PS plate.

In consideration of this, it is necessary to set the temperature of the developer to a constant temperature or less near the heater surface for the purpose of preventing the occurrence of the solids. With respect to countermeasures for setting the temperature of the developer to the constant temperature or less near the heater surface, there are conceivable methods, in one of which an area of the heater surface is enlarged to lower watt density, and in another of which a circulating flow-velocity of the developer is increased at the heater surface. In these cases, there are problems in that the heater has a large size and a circulating pump of large capacity is necessary. Further, it is difficult to prevent the occurrence of the solid image-colorant gradients at a portion where the circulating flow hardly runs. Thus, these methods are not regarded as the ultimate countermeasures. It is also conceived to lower the watt density by reducing a capacity of the heater. In this case, however, there arises a new problem in that it takes a time to heat up the developer. At a start-up time of usual morning, this new problem may be solved by a timer standby function and so forth. Accordingly, troubles are not caused at the start-up time even if the heater has a small capacity. However, when preparing the new liquid, it is impossible to utilize the timer standby function. Thus, the heat-up time becomes long in a case that a temperature of running water is low at the time of preparation of the new liquid.

SUMMARY OF THE INVENTION

In view of the foregoing, it is a primary object of the present invention to provide a photosensitive material processor in which solids and so forth in a processing liquid are prevented from adhering to the photosensitive material.

It is a second object of the present invention to provide a photosensitive material processor in which a heat-up time is prevented from lengthening at a time of preparation of a new liquid.

In order to achieve the above and other objects, the photosensitive material processor according to the present invention comprises a processing bath, a heater and a liquid-flow generator. The processing bath contains a processing liquid for processing a photosensitive material. The heater is disposed in the processing bath to heat the processing liquid. The liquid-flow generator is attached so as to cover the heater and generates a flow of the processing liquid along a circumferential surface of the heater.

In a preferred embodiment, the heater has a rod shape and the liquid-flow generator forms the flow of the processing liquid in a longitudinal direction of the heater.

It is preferable that the photosensitive material processor further comprises a processing-liquid supplying pipe and a processing-liquid circulator. The processing-liquid supplying pipe supplies the processing liquid into the processing bath. The processing liquid contained in the processing bath is discharged from a discharge port. The processing-liquid circulator circulates the discharged processing liquid via the processing-liquid supplying pipe. It is preferable that the liquid-flow generator includes a liquid-flow generating head, which has an outflow opening around the circumferential surface of the heater and to which the processing liquid is supplied from the processing-liquid supplying pipe.

A first gap is formed between the circumferential surface of the heater and the liquid-flow generating head. It is preferable that the liquid-flow generating head has a gap-keeping member for maintaining the first gap in a constant state.

Moreover, it is preferable that the liquid-flow generator is provided with a tubular guide cover for guiding the processing liquid, which has run out of the outflow opening, in the longitudinal direction of the heater.

Further, it is preferable that a second gap formed between the guide cover and the heater becomes gradually narrower in the longitudinal direction of the heater.

Furthermore, it is preferable that the liquid-flow generating head and the guide cover are removably attached.

It is preferable that a flow velocity of the processing liquid flowing along the circumferential surface of the heater is 0.05 m/Sec to 5.0 m/Sec.

According to the photosensitive material processor of the present invention, it is prevented that image colorant transferred during processing of the photosensitive material is deposited on the surface of the heater and becomes solids. Consequently, it is prevented that a part of the solids separates from the surface of the heater and adheres to the photosensitive material to cause a print stain at a printing time. Thus, quality of the photosensitive material is improved.

Further, according to the present invention, it is possible to surely make the processing liquid flow along the circumferential surface of the heater in the longitudinal direction thereof.

By virtue of the gap, which is formed between the guide cover and the heater so as to become narrower in the longitudinal direction of the heater, it is possible to lower a temperature of the heater top whose surface temperature is likely to rise.

When the heater is cleaned at a time of regular maintenance and so forth, it is possible to easily clean the heater by removing the liquid-flow generating head and the guide cover.

BRIEF DESCRIPTION OF THE DRAWINGS

The above objects and advantages of the present invention will become apparent from the following detailed description of the preferred embodiments of the invention when read in conjunction with the accompanying drawings, in which:

FIGS. 2A to 2C are perspective views showing the interior of a developing bath;

FIG. 4 is a sectional side view showing the heater, a branch duct, the liquid-flow generating unit, the gap-forming ring and the heater cover;

DETAILED DESCRIPTION OF THE PREFERRED EMBODIMENT(S)

Figure 1:
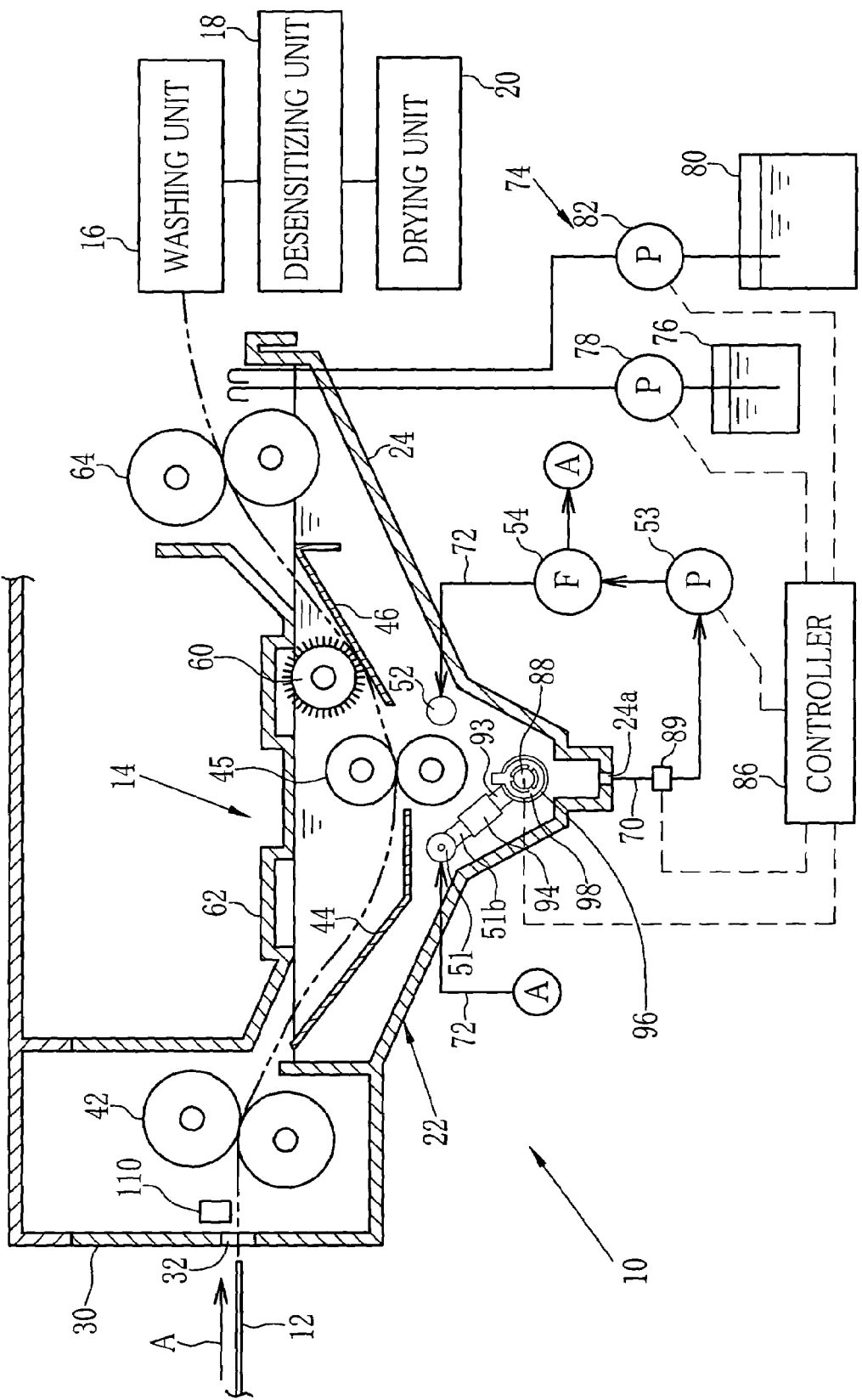
FIG. 1 is a schematic illustration showing a PS-plate processor according to the present invention.

FIG. 1 shows a PS-plate processor 10 according to the present invention. The PS-plate processor 10 processes a PS plate 12 being as a photosensitive material, for which image exposure is performed by an exposing unit not shown. The PS-Plate 12 is a photopolymer plate and so forth. Incidentally, the PS plate 12 includes a photosensitive layer formed on a support of an aluminum plate and so forth, which is a flat plate having a thin rectangular shape. As to the photopolymer plate, the photosensitive layer is formed by stacking an optical junction layer, a photopolymerization layer and an overcoat layer. Image exposure is performed with a laser beam so that polymerization reaction is accelerated at an image area of the photopolymerization layer.

The PS-plate processor 10 comprises a developing unit 14, a washing unit 16, a desensitizing unit 18 and a drying unit 20. In the developing unit 14, the PS plate 12 is processed by a developer. In the washing unit 16, the PS plate processed by the developer is washed with washing water. In the desensitizing unit 18, the washed PS plate 12 is coated with a gum liquid to perform a desensitizing process. In the drying unit 20, the PS plate 12 is dried.

A processing tank 22 is disposed in the PS-plate processor 10. The processing tank 22 includes a developing bath 24 being as a processing bath, which is formed at the position of the developing unit 14. Further, a washing bath and a desensitizing bath (not shown both) are formed at the positions of the washing unit 16 and the desensitizing unit 18.

A slot 32 of a slit shape is formed in an outer panel 30 covering the processing tank 22. The PS plate 12 is inserted through the slot 32.

A carrying roller pair 42 made of rubber is disposed behind the slot 32 of the developing unit 14. The carrying roller pair 42 forwards the PS plate 12, which has been inserted in a direction shown by an arrow A, to the developing unit 14.

The developing bath 24 has a mountain-like shape whose bottom center protrudes downward to contain the developer being as a processing liquid for developing the PS plate 12. The developing bath 24 is provided with guide plates 44 and 46, which are disposed at a lower side of a passage of the PS plate 12 and along the bottom of the developing bath 24. Between the guide plates 44 and 46, a carrying roller pair 45 is disposed. By means of the carrying roller pair 45 and the guide plates 44 and 45, the PS plate 12 is dipped in the developer while carried in the developing bath 24 so as to be guided along a U-like shape. By dipping the PS plate 12 in the developer, unnecessary portions of the exposed photosensitive layer of the PS plate 12 swell and separate from the support so that the unnecessary photosensitive layer is removed in accordance with an exposure image.

The inside of the developing bath 24 is provided with first and second spray pipes (processing-liquid supplying pipes) 51 and 52 disposed under the guide plates 44 and 46. Many liquid holes (not shown) are formed in the respective guide plates 44 and 46. The developer of the developing bath 24 is suctioned by a circulating pump 53, and the suctioned developer is supplied to the first and second spray pipes 51 and 52 via a filter 54.

As shown in FIG. 2, the top of the first spray pipe 51 is provided with a jet orifice 51a to jet the developer in a width direction of the carried PS plate 12. Meanwhile, the second spray pipe 52 is provide with jet orifices 52a formed at regular intervals in the width direction of the PS plate 12 to jet the developer in a carrying direction of the PS plate 12. The first and second spray pipes 51 and 52 jet the developer in the developing bath 24 to stir the developer so that uniform processing is performed for the PS plate 12. At this time, the developer enters the passage side of the PS plate 12 through the liquid holes formed in the guide plates 44 and 46. In virtue of this, it is prevented that the PS plate 12 is rapidly developed and processing unevenness is caused. The first and second spray pipes 51 and 52 are attached to one of sidewalls of the developing bath 24 so as to horizontally project in the developing bath 24 in the width direction of the carried PS plate 12. Near an attachment end of the first spray pipe 51, a branch pipe 51b is formed to send the developer to a liquid-flow generating unit 91 described later.

As shown in FIG. 1, the inside of the developing bath 24 is provided with a brush roller 60 confronting the guide plate 46. While the PS plate 12 is dipped in the developer and is carried along the guide plate 46, the brush roller 60 rotates, making bristles thereof come into contact with a surface of the PS plate 12. By the bristles, the surface of the PS plate 12 is brushed so that it is facilitated to remove the unnecessary photosensitive layer from the surface of the PS plate 12.

In the developing unit 14, a liquid lid 62 is disposed such that a lower surface thereof is positioned under a liquid level of the developer contained in the developing bath 24. The liquid lid 62 occupies a major part of a space existing above the liquid level of the developing bath 24. The carrying roller pair 42 of the entrance side and a carrying roller pair 64 of an exit side are provided with shielding members (not shown) made of silicon rubber. An above side of the liquid level of the developing bath 24 substantially becomes a sealed interspace by means of the liquid lid 62, the shielding members and so forth. Thus, an amount of the air trapped in this interspace is small and it is prevented that the flesh air enters the vicinity of the liquid level of the developer. Consequently, it is prevented that the developer is deteriorated due to carbonic acid gas of the air. In addition, evaporation of moisture is also prevented.

The carrying roller pair 64 whose circumference is made of rubber is disposed at the exit side of the developing bath 24. The carrying roller pair 64 sends the PS plate 12, which has been forwarded from the carrying roller pair 45, to the washing unit 16. At this time, the developer residing on the surface of the PS plate is squeezed out.

In the washing unit 16, the washing water is jetted toward the PS plate 12 to wash out the developer residing on the surface of the PS plate 12. The PS plate 12 having passed through the washing unit 16 is forwarded to the desensitizing unit 18 wherein the gum liquid is dropped onto the PS plate 12 to be coated therewith. The PS plate 12 to which the gum liquid has been applied is forwarded to the drying unit 20 wherein the gum liquid is dried by hot air to form a protective film. The PS plate 12 on which the protective film has been formed is discharged from the processor 10. Upon this, a sequence of processing is completed. Incidentally, the washing unit 16, the desensitizing unit 18 and the drying unit 20 are well known and are minutely described in Japanese Patent Laid-Open Publication Nos. 2000-284501, 2000-107738 and so forth.

The developing unit 14 of the PS processor 10 is provided with the circulating pump 53 being as a circulating member. The circulating pump 53 is connected to a discharge port 24a, which is formed at the bottom of the developing bath 24, via piping 70. The circulating pump 53 is also connected to the first and second spray pipes 51 and 52 respectively via piping 72. In the developing unit 14, the developer of the developing bath 24 is supplied to the first and second spray pipes 51 and 52 through the filter 54 upon actuating the circulating pump 53. And then, the developer is jetted from the first and second spray pipes 51 and 52. By circulating the developer of the developing bath 24 in this way, agitation is performed so as to uniform a liquid temperature, for example. In this embodiment, the processing-liquid circulator for circulating the developer is constituted of the circulating pump 53, the filter 54, the piping 70 and the piping 72.

The PS-plate processor 10 is provided with a liquid restocking mechanism 74 for preventing the developer of the developing bath 24 from deteriorating. The liquid restocking mechanism 74 comprises an undiluted-liquid tank 76, are stocking pump 78, a water tank 80 and a diluting pump 82. The undiluted-liquid tank 76 contains an undiluted liquid to be used for restocking. The restocking pump 78 supplies the undiluted liquid of the tank 76 to the developing bath 24. The water tank 80 contains water for diluting the undiluted liquid at a predetermined rate. The diluting pump 82 supplies the water of the water tank 80 to the developing bath 24.

Further, the PS-plate processor 10 is provided with a controller 86 to which the restocking pump 78 and the diluting pump 82 are connected in addition to the circulating pump 53. The controller 86 actuates the restocking pump 78 and the diluting pump 82 at preset timing to supply the undiluted liquid and the water to the developing bath 24 for the purpose of diluting the undiluted liquid at the predetermined dilution rate. In this way, the developing bath 24 is restocked with the liquid. Incidentally, with respect to the operation timing of the liquid restocking mechanism 74, it is possible to adopt conventionally known timing, and detailed description thereof is omitted in this embodiment.

In the meantime, the inside of the developing bath 24 of the PS-plate processor 10 is provided with a cylindrical heater 88 for regulating a temperature. The heater 88 is attached to an inner side surface of the developing bath 24 to heat the developer of the developing bath 24. By the way, a cooler may be connected to the developing bath 24 as need arises, and the temperature of the developer may be controlled so as to cool the developer of the developing bath 24 by circulating a coolant or stopping the circulation thereof. The position for attaching the heater 88 is not limited to the inner side surface of the developing bath 24. The heater 88 may be attached to a central portion of the developing bath 24 and an intermediate portion between the central portion and the inner side surface of the developing bath 24.

The piping 70 for circulating the developer is provided with a thermistor 89 for detecting the liquid temperature. The thermistor 89 is connected to the controller 86 together with the heater 88. Incidentally, the thermistor 89 may be disposed in the developing bath 24 instead of the inside of the piping 70.

The controller 86 actuates the circulating pump 53 to circulate the developer while the PS pate 12 is processed. During the circulation of the developer, the controller 86 performs on-off control of the heater 88 on the basis of the liquid temperature of the developer detected by the thermistor 89. By virtue of this, the liquid temperature of the developer of the developing bath 24 is maintained at a certain temperature (about 30° C., for example) so that the PS plate 12 is optimally processed.

Figure 3A:
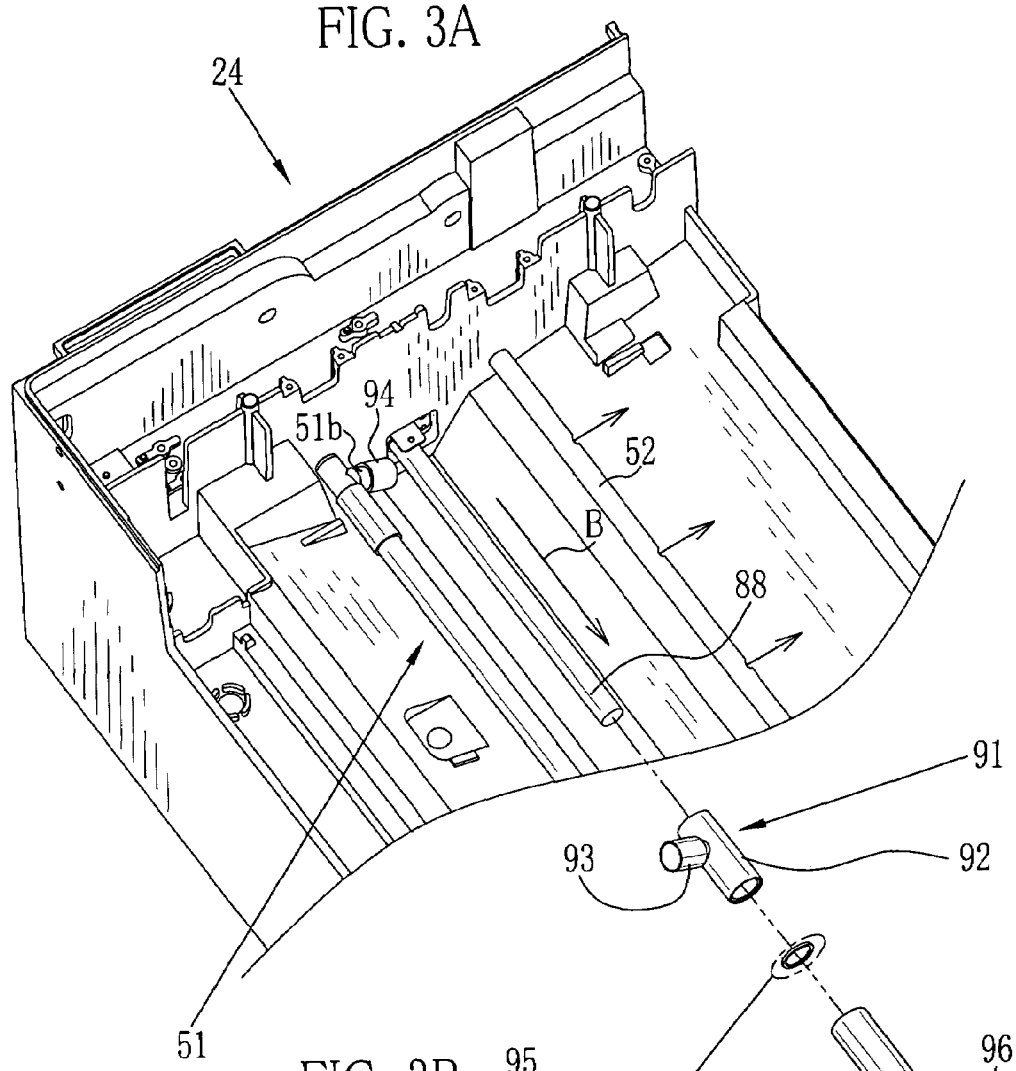
FIGS. 3A and 3B are exploded perspective views showing a heater, a liquid-flow generating unit, a gap-forming ring and a heater cover.
Figure 3B:
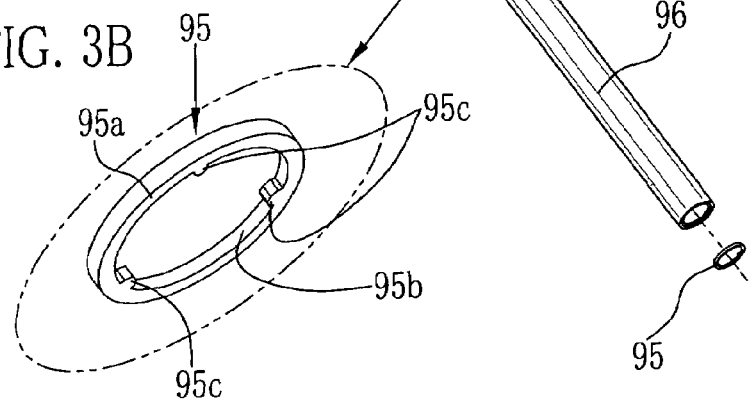

At this time, if the heater 88 is simply turned on and off such as performed in a conventional way, the developer temperature rises and exceeds about 80, for example, near a surface of the heater 88. Due to this, image-colorant ingredients of the developer are deposited and become solids on the surface of the heater 88. A part of the solids separates from the heater 88 and adheres to the PS plate 12 to cause a print stain at a printing time. In view of this, in the present invention, the liquid-flow generating unit 91 compulsorily forms a flow of the developer along the surface of the heater 88 in a longitudinal direction of the heater 88 to prevent the surface temperature of the heater 88 from exceeding about 80° C. By the liquid-flow generating unit 91, it is prevented that the image-colorant ingredients of the developer are deposited on the surface of the heater 88. As shown in FIGS. 2 and 3, the liquid-flow generating unit 91 is made up of a T-shaped duct, which is attached so as to cover an end portion of the heater 88 in the longitudinal direction of the heater 88. The liquid-flow generating unit 91 comprises a liquid-flow generating head 92 and a branch duct 93. The head 92 is made of stainless steel and is attached so as to cover the end portion of the heater 88. The branch duct 93 protrudes from a middle portion of the liquid-flow generating head 92.

The branch duct 93 is connected to the branch pipe 51b of the first spray pipe 51 via a rubber hose 94. Consequently, apart of the developer flowing in the first spray pipe 51 diverges toward the liquid-flow generating head 92.

One end of the liquid-flow generating head 92 is secured to a circumferential surface of the heater 88 to prevent the diverging developer from flowing out. The other end of the liquid-flow generating head 92 has a gap formed between the head 92 and the circumferential surface of the heater 88. A gap-forming ring (gap keeping member) 95 is fitted into the gap. The gap-forming ring 95 includes a ring-shaped body 95a having an opening 95b whose diameter is larger than a diameter of the heater 88. The inside of the body 95a is provided with three ribs 95c formed at intervals of 120 degrees. The rib 95c abuts on the circumferential surface of the heater 88. A circle defined by the tops of the three ribs 95c is formed so as to have the same diameter with the heater 88. By means of the gap-forming ring 95, the constant gap is maintained between the circumferential surface of the heater 88 and the inner surface of the liquid-flow generating head 92 so that the developer uniformly flows along the circumferential surface of the heater 88 in the longitudinal direction of the heater 88. In a conventional photosensitive material processor, a flow velocity of the developer flowing on the circumferential surface of the heater 88 is 0.05 m/Sec or less. In this embodiment, the flow velocity is adapted to be faster than the conventional flow velocity and is 0.5 m/Sec to 0.8 m/Sec. Incidentally, the flow velocity of the developer flowing along the circumferential surface of the heater 88 is 0.05 m/Sec to 5.0 m/Sec. It is preferable that the flow velocity is 0.2 m/Sec to 2.0 m/Sec. It is much preferable that the flow velocity is 0.5 m/Sec to 0.8 m/Sec. Meanwhile, the number of the ribs 95c is not limited to three, and may be properly changed. Further, the entire inner surface of the gap-forming ring 95 may abut on the circumferential surface of the heater 88. In this case, openings (for example, circular holes and ellipse holes) through which the developer flows out are formed in the gap-forming ring 95 in a longitudinal direction of the gap-forming ring 95.

The heater 88 heats the developer flowing in the liquid-flow generating head 92 up to a temperature (for example 22° C.), which is higher by 2° C. than a temperature (20° C.) of the developer being separate from the heater 88.

A heater cover (guide cover) 96 is attached to the liquid-flow generating head 92 so as to cover the heater 88. The heater cover 96 is made of stainless steel and has a tubular shape. A gap is formed between an inner surface of the heater cover 96 and the circumferential surface of the heater 88. Into this gap of the top side of the heater cover 96, is fitted the gap-forming ring 95 by which the gap is kept in a constant state between the circumferential surface of the heater 88 and the inner surface of the heater cover 96. Thus, the developer flowing out of the branch pipe 51b of the first spray pipe 51 is adapted to flow along the circumferential surface of the heater 88 in the longitudinal direction by means of the liquid-flow generating head 92 and the heater cover 96. In other words, the developer constantly flows along the circumferential surface of the heater 88 in the developer-flowing direction B. Since the surface temperature of the heater 88 is lowered by the liquid flow, it is possible to prevent that the high-temperature developer destroys the dispersion state of the image-colorant ingredients transferred into the developer due to processing of the PS plate 12. Thus, it is possible to prevent that the image-colorant ingredients are deposited on the surface of the heater 88 and become the solids. Consequently, it is avoided that a part of the solids separates from the heater 88 and adheres to the PS plate 12. In virtue of this, the print stain is not caused at the printing time so that quality of the PS plate 12 is improved.

As shown in FIG. 4, the inner surface of the heater cover 96 is a taper surface 96a such that the gap between the inner surface of the heater cover 96 and the heater 88 becomes gradually narrower in the developer-flowing direction B. When the developer flows at a constant velocity, the surface temperature of the heater 88 tends to become higher toward the top end of the heater 88 in the longitudinal direction thereof, since the temperature of the developer is raised by the heater 88. In this embodiment, an inclination C of the taper surface 96a is $13/1000$. The inclination C is preferable to be $1/1000$ to $50/1000$, and is much preferable to be $5/100$ to $30/1000$. The flow velocity of the developer becomes gradually faster toward the top end of the heater 88 in the longitudinal direction thereof by the inclination so that the surface temperature of the heater 88 is lowered to a predetermined temperature or less for the entire circumferential surface of the heater 88.

As shown in FIG. 2, an upper portion of the heater cover 96 is provided with a plate-like attachment bracket 98 to which an overheat protection sensor 97 is fixed. The heater 88 is inserted into an attachment hole 98a formed at one end of the attachment bracket 98. The other end of the attachment bracket 98 is screwed on an attachment plate 24b formed on a sidewall of the developing bath 24. The overheat protection sensor 97 has a rectangular parallelepiped shape in which overheat protection liquid is encapsulated. The sensor 97 is connected to an electric contact via a metal tube. When the temperature of the developer becomes a predetermined temperature (for example 55° C.) or more, the overheat protection liquid expands and the electric contact is turned off via the metal tube to shut down the heater 88. Incidentally, the overheat protection sensor is not limited to the sensor encapsulating the overheat protection liquid. The overheat protection sensor may be any sensor capable of detecting the overheat state of the developer.

By the compulsory flow of the developer such as described above, the developer temperature is kept below 80° C. near the surface of the heater 88 so that the deposition of the image-colorant ingredients is prevented on the surface of the heater 88. In addition, the deposition may be further prevented by controlling electric power to be supplied to the heater 88. In this case, an image-colorant content of the developer is summed up and a rate of the image-colorant content is calculated after restocking the developer. On the basis of the rate of the image-colorant content, the electric power to be supplied to the heater 88 is controlled so as to prevent the developer temperature from exceeding 80° C. near the surface of the heater 88.

Figure 5:
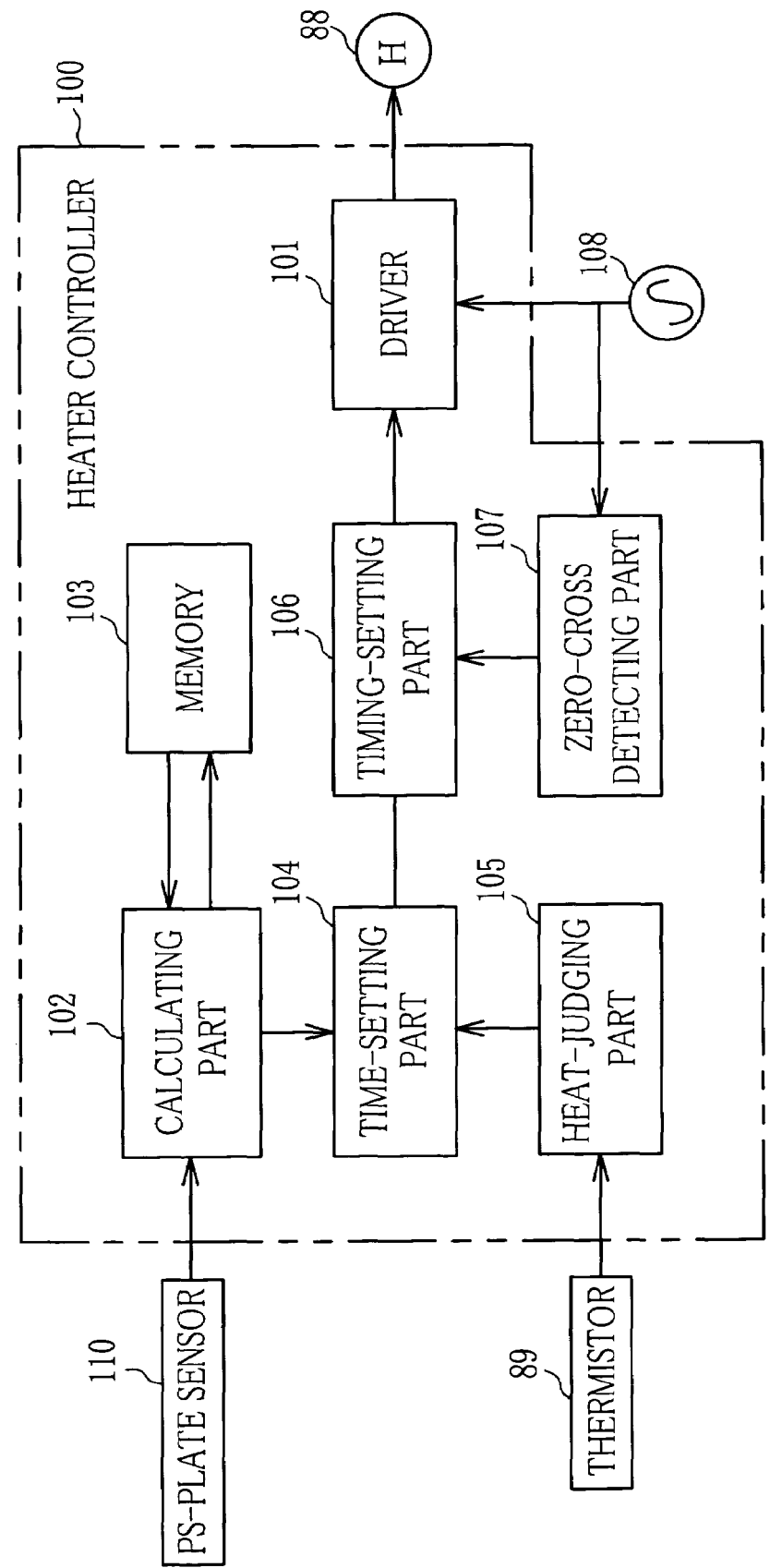
FIG. 5 is a block diagram showing a heater controller.

The controller 86 shown in FIG. 1 includes a heater controller 100 shown in FIG. 5, which performs heating control for the heater 88. Although the controller 86 has general functions for controlling the respective units of the PS-plate processor 10, the heating control for the heater 88 is selectively described in this embodiment.

The heater controller 100 comprises a driver 101, a calculating part 102 for the rate of the image-colorant content, a memory 103, a time-setting part 104, a heat-judging part 105, a timing-setting part 106 and a zero-cross detecting part 107. The driver 101 supplies an AC power to the heater 88 from an AC-power supply 108. The driver 101 also performs to cut the supply of the AC power. The heater controller 100 controls an effective value of an alternating voltage to be supplied to the heater 88. In accordance with the effective value, the heater 88 is actuated to heat the developer. At this time, the current rate of the image-colorant content of the developer is calculated, and in accordance with this rate, the effective value of the alternating voltage to be supplied to the heater 88 is controlled so as to prevent the developer temperature from exceeding 80° C. near the surface of the heater 88. Meanwhile, a PS-plate sensor 110 is connected to the calculating part 102 and the thermistor 89 is connected to the heat-judging part 105. The PS-plate sensor 110 is disposed near the slot 32 and at the inside thereof. The PS-plate sensor 110 outputs an ON-signal upon detection of the PS plate 12. On the basis of the ON-signal, it is detected that an anterior end and a posterior end of the PS plate 12 have passed, and at the same time, a length of the PS plate 12 is calculated.

Figure 6:
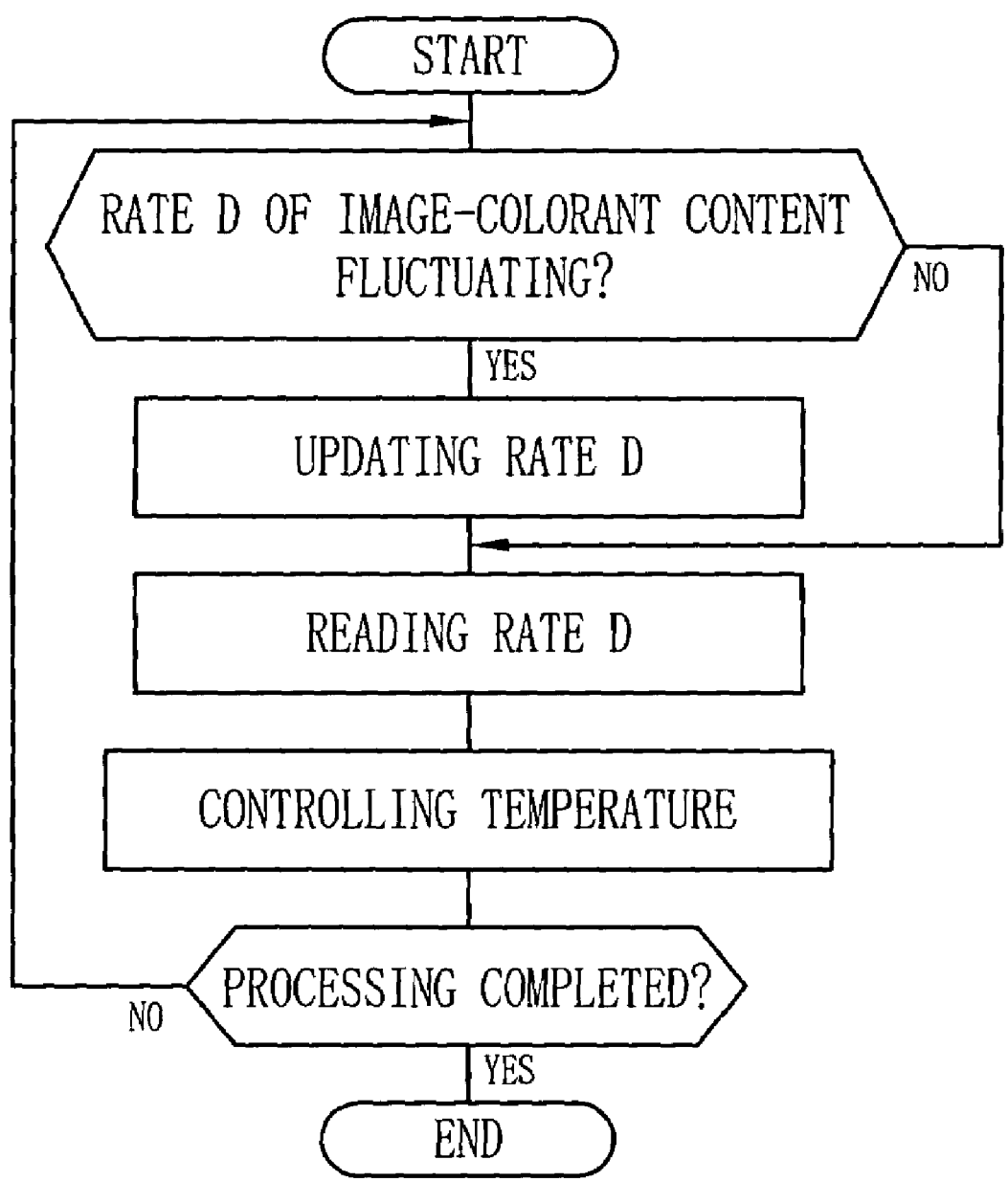
FIG. 6 is a flowchart showing a procedure for regulating a temperature of a developer.

FIG. 6 shows a flowchart of developer-temperature control performed by the heat controller 100. First of all, it is judged whether the rate of the image-colorant content fluctuates or not. This judgement is delivered on the basis of whether the developer is restocked or not and whether or not a plate-processing amount (a plate-processing area) exceeds a prescribed value. When the fluctuation has been judged, the rate of the image-colorant content is calculated. The calculated rate is stored in the memory 103 as the update. Successively, the current rate of the image-colorant content is read out to determine a duty ratio on the basis of the current rate. After that, the thermistor 89 detects the temperature of the developer to regulate this temperature on the basis of the detected temperature. The temperature of the developer is regulated so as to be kept within a predetermined temperature range. When the developer temperature becomes less than a lower limit, the heater 88 is turned on to perform heating. In contrast, when the developer temperature exceeds an upper limit, the heater 88 is turned off. When the heating control is performed by the heater 88, the duty ratio is determined on the basis of the rate of the image-colorant content. In accordance with the determined duty ratio, the electric power to be supplied to the heater 88 is controlled.

Figure 7:
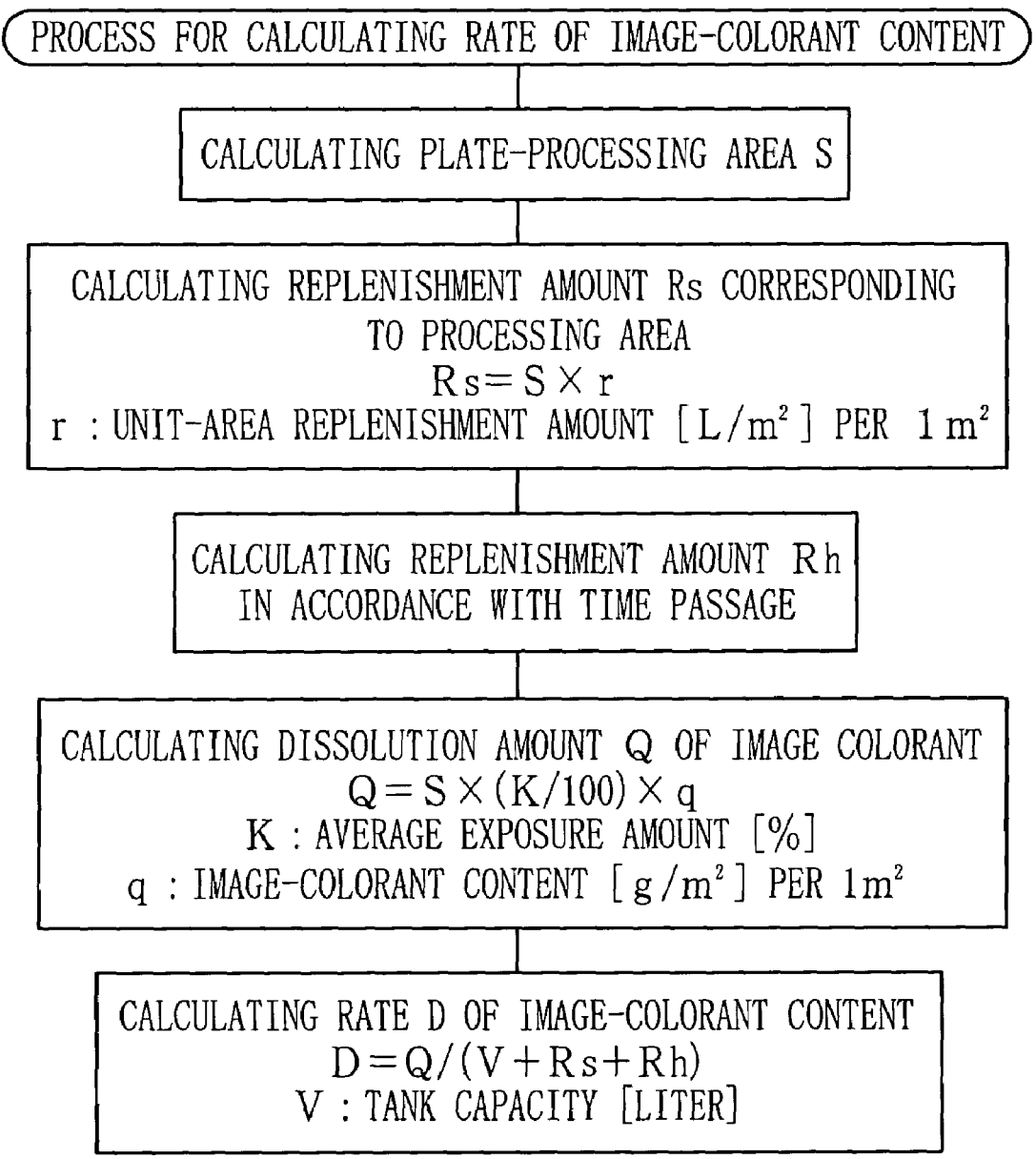
FIG. 7 is a flowchart showing a procedure for calculating a rate of image-colorant content.

The calculating part 102 calculates the rate D of the image-colorant content along a flowchart shown in FIG. 7. The memory 103 stores the current rate D of the image-colorant content. The rate D is newly calculated by the calculating part 102 when the liquid has been restocked in accordance with increment of the plate-processing area of the PS plate 12 and has been restocked for compensating deterioration of the developer. A value of the new rate is stored in the memory 103 as the update. This value is reset to zero at a time when the developer is newly made.

The rate D of the image-colorant content is calculated such as described below. First of all, the plate-processing area S [m$^2$] is calculated from an ON time of the PS-plate sensor 110 and input data of an average width of the PS plate 12. The PS-pate sensor 110 is disposed at the slot 32 of the PS-plate processor 10, such as shown in FIG. 1. The average width of the PS plate is inputted from a data-input portion, which is not shown, by an operator and other. Incidentally, instead of using the average-width data, the plate-processing area S may be calculated from a width-detection signal and the ON time of the PS-plate sensor 110. The width-detection signal is obtained from a sensor, which is disposed at the slot 32 to detect the width of the PS plate.

Then, on the basis of the plate-processing area S, a replenishment amount Rs [liter] corresponding to this processing area is calculated from the following equation, $$Rs = S \times r$$

wherein r represents a unit-area replenishment amount [liter/m$^2$] per unit area (1 m$^2$). This amount r is predetermined for each kind and is stored in the memory 103.

Then, another replenishment amount Rh [liter] concerning time passage is calculated to prevent the developer from deteriorating due to contact with carbon dioxide of the air at the time of operation and stoppage of the processor. As to the replenishment amount Rh, a unit-time replenishment amount of unit elapsed-time is predetermined regarding each of waiting time and operation time. For instance, the replenishment amount Rh is calculated on the basis of the cumulative waiting time and the cumulative operation time reckoned from the time when the new liquid has been made.

Then, a dissolution amount Q [g] of the image colorant is calculated. The dissolution amount Q means a value of the image colorant dissolving into the developer from an exposure portion of the PS plate 12. The dissolution amount Q is calculated from the following equation, $$Q = S \times (K/100) \times q$$

wherein q represents the image-colorant content per unit area (1 m$^2$) of the PS plate 12, and q is predetermined for each kind of the PS plate to be processed and is stored in the memory 103.

Then, the rate D [g/liter] of the image-colorant content dissolving in the developer is calculated. The rate D is calculated from the following equation on the basis of the plate-processing area and the replenishment amounts, $$D = Q/(V + Rs + Rh)$$

wherein V represents tank capacity. The calculated rate D is stored in the memory 103 as the update. Whenever a predetermined period passes during the operation time and whenever the liquid is restocked, the rate D of the image-colorant content is calculated and is updated.

Figure 8A:
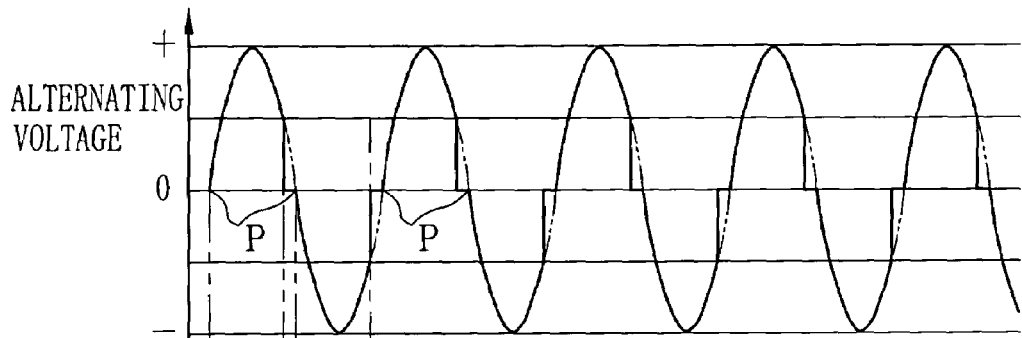
FIGS. 8A and 8C are diagrammatic views showing examples of waveforms of alternating voltages to be supplied to the heater.
Figure 8B:
FIGS. 8B and 8D are diagrammatic views showing examples of signals for driving the heater.
Figure 8C:
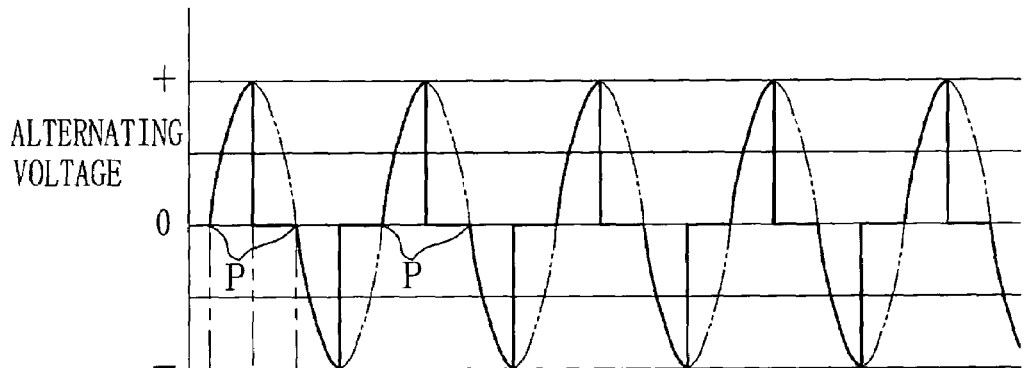
Figure 8D:

When the heater 88 is actuated, the heater controller 100 sets the ON time for supplying the electric power and the OFF time for cutting the supply of the electric power within a half cycle of the alternating voltage. The driver 101 is actuated on the basis of the setting result. In other words, such as shown in FIGS. 8A to 8D, the driver 101 electrifies the heater 88 during the ON time $T_{ON}$ and avoids electrifying the heater 88 during the OFF time $T_{OFF}$ within the half cycle of the alternating voltage when actuating the heater 88. Incidentally, FIG. 8B shows ON/OFF of the driver 101, and a solid line in FIG. 8A shows a change of an output voltage corresponding to ON/OFF of the driver 101. By the way, FIGS. 8A and 8B show a case in that the duty ratio is 80%, and FIGS. 8C and 8D show a case in that the duty ratio is 50%.

Figure 9:
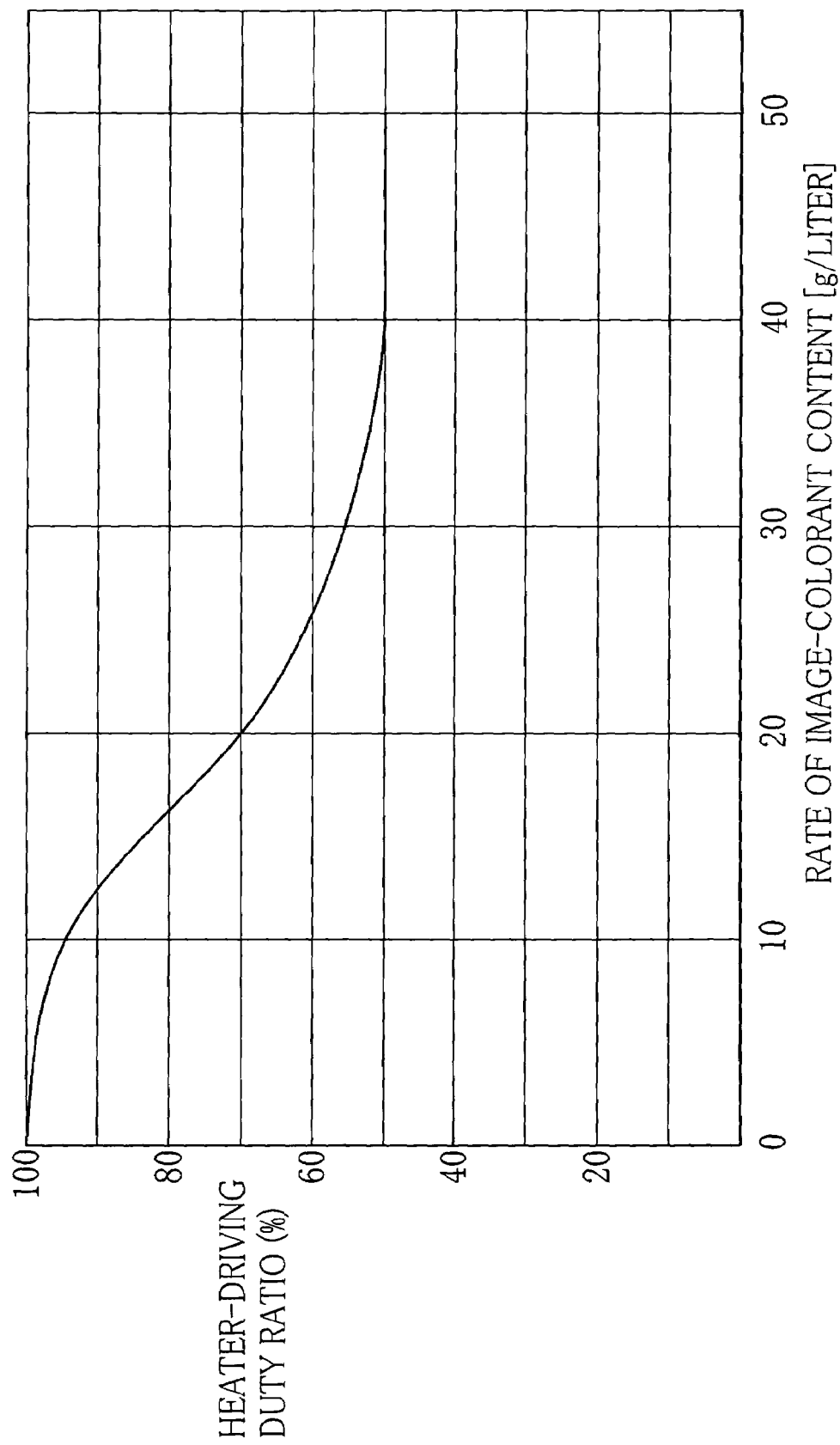
FIG. 9 is a diagrammatic view showing an example of a relationship between the rate of the image-colorant content and a duty ratio for driving the heater.

In the time setting part 104, the current rate D of the image-colorant content is read out of the memory 103 to calculate a heater-driving duty ratio from this rate D. A relationship between the rate D of the image-colorant content and the heater-driving duty ratio is predetermined, and FIG. 9 shows an example of this relationship. When the rate D of the image-colorant content is zero, the duty ratio is 100%. As the rate D increases due to processing of the PS plate 12, the duty ratio gradually lowers. In this embodiment, the duty ratio is 95%, 70%, 55%, 50% and 50% respectively when the rate D is 10[g/liter], 20[g/liter], 30[g/liter], 40[g/liter] and 50[g/liter]. By controlling the ON time $T_{ON}$ in accordance with the obtained duty ratio, the heater 88 is controlled so as to prevent the developer temperature from exceeding 80° C. near the surface of the heater 88.

In brief, when the rate D of the image-colorant content of the developer is high, the time-setting part 104 shortens the ON time $T_{ON}$ to reduce a heating amount of the heater 88. In contrast, when the rate D is low, the time-setting part 104 lengthens the ON time $T_{ON}$.

The zero-cross detecting part 107 detects a zero-cross point P (see FIG. 8A) where polarity of the alternating voltage inputted from the AC-power supply 108 changes. The timing-setting part 106 activates the driver 101 on the basis of the detection result of the zero-cross detecting part 107 and the ON time $T_{ON}$ set by the time setting part 104.

The heater controller 100 further comprises the heat-judging part 105, which detects the temperature of the developer by the thermistor 89. When the detected temperature is a predetermined value or less, the heat-judging part 105 outputs a heater-turning-on signal to the time-setting part 104. When the temperature detected by the thermistor 89 exceeds the predetermined value, a heater-turning-off signal is outputted to the time-setting part 104. When the heater-turning-on signal has been outputted, the duty ratio is calculated on the basis of the current rate of the image-colorant content, and the ON time $T_{ON}$ is set on the basis of the calculated duty ratio. Consequently, the heating amount of the heater 88 is controlled on the basis of the rate D of the image-colorant content of the developer. Thus, it is prevented that the dispersion state of the image colorant is destroyed by the heat and the image colorant is deposited and becomes the solid on the surface of the heater 88. As a result, it is prevented that the solid adheres to the PS plate 12 and the print stain is caused.

In the PS-plate processor 10 having the above structure, the PS plate 12 inserted through the slot 32 is carried to the developing unit 14. On this PS plate, an image has been recorded by a printing device or the like not shown. The PS-plate sensor 10 is turned on when the anterior end of the PS plate 12 has passed. After that, the PS-plate sensor 110 is turned off when the posterior end of the PS plate 12 has passed. Upon an anterior-end detection signal of the PS-plate sensor 110, a timer (not shown) included in the controller is started. On the basis of an elapsed time measured by this timer, a driver for carrying the PS plate 12 is controlled. In addition, timing for jetting the washing water in the washing unit 16 is determined. Further, timing for applying the gum liquid in the desensitizing unit 18 is also determined.

The PS plate 12 forwarded into the developing unit 14 is dipped in the developer to swell the unnecessary potion of the photosensitive layer caused in accordance with the exposure image. The swelled photosensitive layer is removed from the support. At this time, by blushing the surface of the PS plate 12 with the brush roller 60, removing the unnecessary photosensitive layer from the surface of the PS plate 12 is facilitated. After the developing process, the processes of washing, desensitizing and drying are performed in order.

An operation of the PS-plate processor 10 having the above structure is described below. Upon actuation of the circulating pump 53, the developer of the developing bath 24 is supplied to the first and second spray pipes 51 and 52 through the filter 54. The developer supplied to the first spray pipe 51 is divided to successively flow in the first spray pipe 51 and to flow in the branch pipe 51b. The developer flowing in the first spray pipe 51 is jetted from the jet orifice 51a. The developer flowing in the branch pipe 51b is forwarded to the liquid-flow generating head 92 through the branch duct 93. And then, the forwarded developer flows along the circumferential surface of the heater 88 in the developer-flowing direction B by means of the liquid-flow generating head 92 and the heater cover 96. After that, the developer is jetted from the end of the heater cover 96 into the developing bath 24. In virtue of this, the developer always flows along the circumference of the heater 88 in the developer-flowing direction B. At this time, the peripheral temperature of the heater 88 was measured. From the obtained measurement result, temperature distribution was substantially uniform at 80° C. or less within the longitudinal entire length of the heater 88. Accordingly, it is prevented that the image colorant transferred into the developer due to processing of the PS plate 12 is deposited and becomes the solids on the heater 88. Consequently, it is prevented that a part of the solids separates from the heater 88 to adhere to the PS plate 12 and the print stain is caused at the printing time. Thus, print quality of the PS plate 12 is improved. The taper surface 96a, which is the inner surface of the heater cover 96, has the inclination C such that the gap between the taper surface 96a and the heater 88 becomes smaller in the developer-flowing direction B. By virtue of the inclination C, the flow velocity of the developer becomes faster toward the end of the heater cover 96. Although the heater 88 has a tendency that the temperature of the end becomes high, it is possible to lower the temperature of the entire surface of the heater 88 to the predetermined temperature or less.

The image-colorant content of the developer is cumulatively calculated, and the rate of the image-colorant content is calculated after liquid replenishment and after replenishment caused due to time passage. On the basis of the calculated rate of the image-colorant content, the electric power to be supplied to the heater 88 is controlled so as to prevent the developer temperature from exceeding 80° C. near the heater surface. Consequently, it is prevented that the image colorant is deposited and becomes the solid on the surface of the heater 88. Thus, it is more surely prevented that the solid adheres to the PS plate 12 and the print stain is caused.

When the heater 88 is cleaned at a time of regular maintenance and so forth, the developer of the developing bath 24 is fully drained and the liquid-flow generating unit 91 and the heater cover 96 are removed. In comparison with a case in that the liquid-flow generating unit 91 and the heater cover 96 are attached in a non-removable manner, the heater 88 may be easily cleaned.

The photosensitive planographic printing plate used in the present invention is not especially limited. It is possible to use various photosensitive planographic printing plates in which image recoding layers of a photosensitive layer, a thermosensitive layer and so forth are respectively formed on the supports. As to the image recording layers, for example, there are a thermal positive type described in Japanese Patent Laid-Open Publication No. 7-285275 and Japanese Patent Application No. 2002-154279, a thermal negative type described in Japanese Patent Laid-Open Publication Nos. 7-20625 and 11-218903, and a photopolymer negative type described in Japanese Patent Laid-Open Publication Nos. 2001-100412 and 2002-169282. A thermosensitive positive-type planographic printing plate having multi layers is especially preferable. This plate is described in Japanese Patent Laid-Open Publication No. 11-218914 and Japanese Patent Application Nos. 2002-499707, 2003-189095 and 2003-181121.

Regarding a structure of the thermosensitive layer of the photosensitive positive-type planographic printing plate, there are an IR ray absorbing dye, alkali-soluble resin and so forth. Although there is no limitation in the case of the well-known alkali-soluble resin (water-insoluble and alkaline water-soluble resin), high polymer having a functional group in a molecule is preferable. The functional group is any of (1) a phenolic hydroxyl group, (2) a sulfonamide group and (3) an active imido group. When the thermosensitive layer is formed, various additives may be added besides the above components as need arises.

For the purpose of improving inhibition (for solubility) of the planographic printing original plate, the thermo sensitive layer may include various inhibiters. Although this inhibiter is not especially limited, there are quaternary ammonium salt, polyethyleneglycol-based compound and so forth. In the case that the inhibition is improved, sensitivity is adapted to lower. In this case, it is effective to add lactone compound. Further, for the purpose of improving dissolution inhibiting properties of the surface of the thermosensitive layer and for the purpose of improving resistance to scratches of the surface, it is preferable to also add a polymer whose component is (meth) acrylate monomer having two or three perfluoroalkyl groups of 3-20 C, such as described in Japanese Patent Laid-Open Publication No. 2000-187318. Incidentally, an acid anhydride, a phenol compound and an organic acid maybe also added for the purpose of further improving the sensitivity.

In the thermosensitive layer, surface-active agents may be included for the purpose of improving coating properties and processing stability relative to development conditions. Moreover, the thermosensitive layer may include printing-out agents for obtaining a visible image just after heating of exposure. Dye and pigment may be added in the thermosensitive layer as the image colorant. As need arises, plasticizer for obtaining plasticity of coating may be added. Further, a waxing compound may be added and a compound for lowering coefficient of static friction may be added for the purpose of obtaining resistance to scratches.

It is possible to produce the planographic printing original plate by dissolving compositions of the thermosensitive layer, which includes the above components, in a solvent and by coating the compositions on a proper support.

The developer used in the present invention includes the following components. The developer and the replenishment liquid thereof are alkali solutions whose pH is 10.0 to 13.5. This pH is much preferable to be 11.0 to 13.3. It is possible to use the well-known alkali solution as the developer and the replenishment liquid thereof. For instance, there are inorganic alkali agents of sodium silicate, potassium silicate and so forth. It is also possible to use organic alkali agents of monomethylamine, dimethylamine and so forth.

While the printing plate is processed in the developer, the unnecessary thermosensitive layer is transferred into the developer. As to the components of the thermosensitive layer transferred and dispersing in the developer, there is the image colorant for example. Sometimes, the dispersion state of the image colorant is destroyed by heating of the heater and the image colorant is deposited. The deposition of the image colorant is not exclusive, but the other components of the thermosensitive layer are sometimes deposited.

By the way, in the above embodiment, the heater 88 has the cylindrical shape. The present invention, however, is applicable to heaters having a polygonal section, a spherical shape and a polyhedron (for instance, octahedron and dodecahedron). In these cases, the liquid-flow generating unit 91, the gap-forming ring 95 and the heater cover 96 are formed so as to have a shape corresponding to the shape of the heater.

Moreover, in the above embodiment, the developer flows in the longitudinal direction of the heater 88 by means of the liquid-flow generating head 92 of the liquid-flow generating unit 91. However, it is sufficient that the developer flows in the longitudinal direction of the circumferential surface of the heater 88. For example, a small pump may be disposed in the developing bath 24 to make the developer flow in the longitudinal direction along the circumferential surface of the heater 88.

Further, in the above embodiment, the liquid-flow generating head 92 is disposed at the attachment side of the heater 88. However, the head 92 may be disposed at a top side or a central portion of the heater 88. In the case that the head 92 is disposed at the central portion, orifices may be formed at both ends of the liquid-flow generating head 92 to make the developer flow toward both ends of the heater 88.

Moreover, in the above embodiment, the liquid-flow generating unit 91 and the heater cover 96 are independently provided. However, the unit 91 and the cover 96 may be unitized as a single member.

Further, in the above embodiment, the gap between the outer surface of the heater 88 and the inner surface of the heater cover 96 is kept in a constant state by the gap-forming ring 95. However, in a case that this gap is kept in the constant state by merely attaching the heater cover 96 to the liquid-flow generating head 92, the gap-forming ring 95 may be removed.

Moreover, in the above embodiment, the heater cover 96 is attached to the liquid-flow generating head 92, and the developer flowing out of the head 92 flows along the longitudinal circumference of the heater 88 in the liquid-flowing direction B. However, in case that the liquid-flow generating head 92 is formed so as to make the developer flow along the longitudinal circumference of the heater 88 in the direction B, the heater cover 96 may be removed.

Further, in the above embodiment, the rate D of the image-colorant content is used as the control parameter for controlling the actuation of the heater. However, it is sufficient that the parameter is related to the rate D of the image-colorant content. For example, the heater may be controlled on the basis of a relationship between the parameter and the electric power for driving the heater. This relationship is obtained in advance by using the cumulative processing time of the processing liquid, the replenishment amount of the processing liquid and so forth. In this case, the electric power for driving the heater is reduced on the basis of the cumulative processing time of the processing liquid as the cumulative processing time increases. When the heater is controlled on the basis of the cumulative processing time, this cumulative processing time may be corrected in consideration of the replenishment amount of the processing liquid.

Moreover, in the above embodiment, the ON time TON is set within the half cycle of the alternating voltage. However, this is not exclusive. For instance, so-called cycle control may be performed. In the cycle control, a turn-on cycle of the alternating voltage for supplying the electric power to the heater 88 and a turn-off cycle for halting the supply of the electric power are set, and the effective value of the alternating voltage to be supplied to the heater 88 is controlled in accordance with a ratio of the turn-on cycle to the turn-off cycle.

Further, in the above embodiment, the heater 88 is driven and heated by using the AC-power supply 108. However, since it is sufficient that the developer is heated so as to prevent the temperature thereof from exceeding a predetermined value near the surface of the heater 88, the heater may be driven by a DC-power supply. In this case, it is possible to adopt any control method in which, for example, a pulse voltage is supplied to the heater and a duty ratio is controlled.

Moreover, in the above embodiment, the PS-plate processor 10 for processing the printing plate (PS plate 12) of the photopolymer plate and so forth is described as the photosensitive material processor. However, it is possible to apply the present invention to another photosensitive material processor using a processing liquid including a component, which is deposited on the heater 88 and becomes the solid. By doing so, generation of the solid is prevented in the processing liquid. The present invention is not limited to the heater used for the photosensitive material processor, but is applicable to heaters used in the other various liquids.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photosensitive material processor for processing a photosensitive material with a processing liquid, comprising
    a processing bath for containing said processing liquid;
    a heater disposed in said processing bath to heat said processing liquid; and
    a liquid-flow generator attached so as to cover said heater and for forming a flow of said processing liquid near a circumferential surface of said heater,
    wherein said liquid-flow generator comprises:
        a liquid-flow generating head having an outflow opening formed between the circumferential surface of said heater and said liquid-flow generating head, said processing liquid being supplied from said processing-liquid supplying pipe to said liquid-flow generating head.

2. A photosensitive material processor according to claim 1, wherein said heater is made in a rod shape and said liquid-flow generator forms the flow of said processing liquid in a longitudinal direction of said heater.

3. A photosensitive material processor according to claim 2, further comprising:
    a processing-liquid supplying pipe for supplying said processing liquid into said processing bath; and
    a processing-liquid circulator for circulating said processing liquid, which is contained in said processing bath, via said processing-liquid supplying pipe after said processing liquid has been discharged through a discharge port.

4. A photosensitive material processor according to claim 1, wherein said liquid-flow generating head comprises:
    a gap-keeping member for maintaining a first gap, which is formed between the circumferential surface of said heater and said liquid-flow generating head, in a constant state.

5. A photosensitive material processor according to claim 4, wherein said gap-keeping member has a ring shape, and a plurality of ribs for abutting on the circumferential surface of said heater are formed on an inner surface of said gap-keeping member.

6. A photosensitive material processor according to claim 5, wherein said ribs are disposed on the inner surface of said gap-keeping member at regular intervals.

7. A photosensitive material processor according to claim 1, wherein said liquid-flow generator further comprises:
    a tubular guide cover attached to said liquid-flow generating head, said guide cover surrounding said heater and guiding said processing liquid, which has flowed out through said outflow opening, in the longitudinal direction of said heater.

8. A photosensitive material processor according to claim 7, wherein a second gap formed between said guide cover and said heater becomes gradually narrower in the longitudinal direction of said heater.

9. A photosensitive material processor according to claim 7, wherein said liquid-flow generating head and said guide cover are removably attached.

10. A photosensitive material processor according to claim 1, wherein said liquid-flow generator is connected to a branch pipe formed on said processing-liquid supplying pipe, and a part of said processing liquid flowing in said processing-liquid supplying pipe is forwarded to said liquid-flow generator.

11. A photosensitive material processor according to claim 10, wherein said liquid-flow generator is connected to said branch pipe of said processing-liquid supplying pipe via a rubber hose.

12. A photosensitive material processor according to claim 11, wherein said discharge port is formed at the bottom of said processing bath.

13. A photosensitive material processor according to claim 12, wherein said processing liquid discharged from said discharge port is forwarded to said processing-liquid supplying pipe through a filter.

14. A photosensitive material processor according to claim 1, wherein a flow velocity of said processing liquid is 0.05 m/Sec to 5.0 m/Sec at the circumferential surface of said heater.

15. A photosensitive material processor according to claim 1, further comprising:
    a heater controller for controlling said heater, said heater controller controlling said heater in accordance with a content of image colorant transferred into said processing liquid.

16. A photosensitive material processor according to claim 15, wherein said heater controller calculates a rate of the content of said image colorant to control said heater on the basis of a duty ratio determined from said rate of the content.

17. A photosensitive material processor according to claim 16, wherein said processing liquid is a developer for developing said photosensitive material.

18. A photosensitive material processor according to claim 1, wherein a bottom of the processing bath is inclined toward a central section, and the heater is disposed in the central section.

19. A photosensitive material processor according to claim 1, wherein a temperature measurement device is connected to said heater in order to control the heater on and off to maintain a temperature of the processing liquid.

20. A photosensitive material processor according to claim 19, wherein the temperature measurement device is disposed in a discharge pipe of the processing bath.

21. A photosensitive material processor according to claim 19, wherein the temperature measurement device is disposed in the processing bath.

22. A photosensitive material processor according to claim 1, wherein said liquid-flow generating head comprises:

a gap-keeping member for maintaining a first gap, which is formed between an outer circumferential surface of said heater and said an inner circumferential surface of said liquid-flow generating head.

23. A photosensitive material processor for processing a photosensitive material with a processing liquid, comprising a processing bath for containing said processing liquid;

a heater disposed in said processing bath to heat said processing liquid; and a liquid-flow generator attached so as to cover said heater and for forming a flow of said processing liquid near a circumferential surface of said heater;

wherein said liquid-flow generator comprises:

a liquid-flow generating head having an outflow opening formed between the circumferential surface of said heater and said liquid-flow generating head, said processing liquid being supplied from a processing-liquid supplying pipe to said liquid-flow generating head; and wherein said heater is made in a rod shape and said liquid-flow generator forms the flow of said processing liquid in a longitudinal direction of said heater.

24. A photosensitive material processor according to claim 23, wherein said liquid-flow generating head comprises:

a gap-keeping member for maintaining a first gap, which is formed between the circumferential surface of said heater and said liquid-flow generating head, in a constant state.

25. A photosensitive material processor according to claim 24, wherein said gap-keeping member has a ring shape, and a plurality of ribs for abutting on the circumferential surface of said heater are formed on an inner surface of said gap-keeping member.

26. A photosensitive material processor according to claim 25, wherein said ribs are disposed on the inner surface of said gap-keeping member at regular intervals.

27. A photosensitive material processor according to claim 23, wherein said liquid-flow generator further comprises:

a tubular guide cover attached to said liquid-flow generating head, said guide cover surrounding said heater and guiding said processing liquid, which has flowed out through said outflow opening, in the longitudinal direction of said heater.

28. A photosensitive material processor according to claim 27, wherein a second gap formed between said guide cover and said heater becomes gradually narrower in the longitudinal direction of said heater.

29. A photosensitive material processor according to claim 27, wherein said liquid-flow generating head and said guide cover are removably attached.

30. A photosensitive material processor according to claim 23, wherein said liquid-flow generator is connected to a branch pipe formed on said processing-liquid supplying pipe, and a part of said processing liquid flowing in said processing-liquid supplying pipe is forwarded to said liquid-flow generator.

31. A photosensitive material processor according to claim 30, wherein said liquid-flow generator is connected to said branch pipe of said processing-liquid supplying pipe via a rubber hose.

32. A photosensitive material processor according to claim 31, wherein said discharge port is formed at the bottom of said processing bath.

33. A photosensitive material processor according to claim 32, wherein said processing liquid discharged from said discharge port is forwarded to said processing-liquid supplying pipe through a filter.

* * * * *